Figure 1:
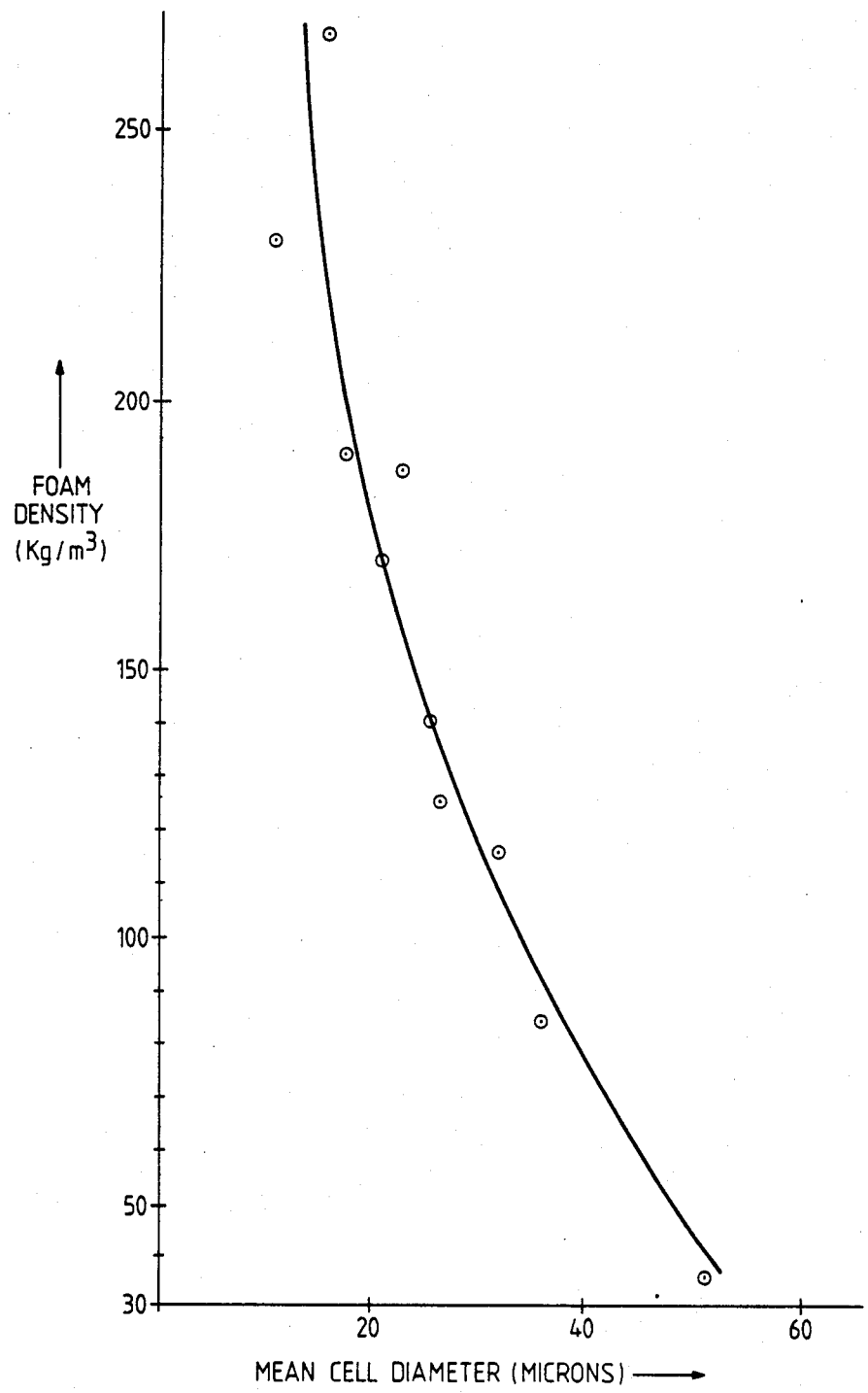

United States Patent [19]
Jackson et al.

[11] Patent Number: 4,547,469
[45] Date of Patent: * Oct. 15, 1985

[54] INORGANIC FOAMS

[75] Inventors: Graham V. Jackson; William N. Meredith, both of Chester, England

[73] Assignee: Imperial Chemical Industries PLC, London, England

[*] Notice: The portion of the term of this patent subsequent to Jul. 26, 2000 has been disclaimed.

[21] Appl. No.: 498,171

[22] Filed: May 25, 1983

[30] Foreign Application Priority Data

Jun. 3, 1982 [GB] United Kingdom ................ 8216210

[51] Int. Cl.[4] ............................................. C04B 21/02
[52] U.S. Cl. ....................................... 501/84; 501/85; 106/86
[58] Field of Search ........................ 501/84, 85; 106/86

[56] References Cited
U.S. PATENT DOCUMENTS

| | | | |
|---|---|---|---|
| 3,737,332 | 6/1973 | Sennet et al. | 501/84 |
| 3,944,425 | 3/1976 | Madger | 501/84 |
| 4,123,285 | 10/1978 | Schuster et al. | 501/84 |
| 4,269,628 | 5/1981 | Ballard et al. | 106/86 |
| 4,395,456 | 7/1983 | Jackson et al. | 501/85 |
| 4,424,280 | 1/1984 | Malric | 501/84 |

Primary Examiner—John Doll
Assistant Examiner—Jackson Leeds
Attorney, Agent, or Firm—Cushman, Darby & Cushman

[57] ABSTRACT

Strong rigid foams comprising one or more layer minerals useful as insulation and fire-protection materials contain cells of which the mean diameter is below 60 microns, 90% have a diameter below 100 microns and substantially all are of diameter below 150 microns and are made by gasifying an aqueous suspension of the layer mineral(s) to produce a wet foam or froth containing bubbles of gas of which the diameters are as stated above and removing water from the wet foam or froth.

20 Claims, 2 Drawing Figures

INORGANIC FOAMS

This invention relates to inorganic foams and their production and particularly to rigid inorganic foams of cellular structure comprising one or more layer minerals, and the production of such foams.

It is known that layer silicate minerals, sometimes called phyllosilicate minerals, can be converted into rigid foams of cellular structure by gasification of a suitable aqueous suspension of the layer mineral to form a stable wet foam or froth followed by removal of water from the wet foam or froth. Layer mineral foams and their production are described, for example, in United Kingdom Patent Specification Nos. 1,585,104 (vermiculite) and 986,635 (clay), United Kingdom Patent Application No. 2,067,174A (layer mineral) and U.S. Pat. Nos. 3,737,332 (clay) and 4,130,687 (vermiculite). Improved rigid foams comprising vermiculite and a solid particulate material selected from the oxides and hydroxides of calcium and magnesium, and their production, are described in European Patent Publication No. 9310A1 and corresponding U.S. Pat. No. 4,269,628.

The density of rigid layer mineral foams produced as described above may vary over a wide range, for example from as low as 50 or 60 Kg/m$^3$ to as high as 500 Kg/m$^3$ or even higher. The strength, and in particular the compressive strength, of the known rigid foams also varies over a wide range and whilst in general foam strength increases with foam density as is to be expected there have been many exceptions and it has not hitherto been possible accurately to predetermine that a strong foam will be formed by the known processes. The production of foams has been essentially a matter of trial and error involving varying parameters such as the foaming apparatus employed, the concentration of the aqueous suspension used to form the foam, the size of particles in the suspension, the amount of gas incorporated in the suspension and the type and amount of the foaming agent employed and the foaming conditions until a reasonably satisfactory rigid foam is obtained. Results are reproduceable for any particular starting material and operating conditions but the approach to making rigid foams has hitherto been qualitative rather than quantitative.

We have now found that irrespective of the particular layer mineral employed and the density of the resulting rigid foam, a foam of high strength is obtained if the production process is operated such that the diameter of substantially all of the cells in the resulting foam is below 150 microns and especially is within a specific range of sizes.

According to the present invention there is provided a rigid foam of cellular structure comprising one or more layer minerals wherein the mean cell diameter is less than 60 microns, substantially all of the cells are of diameter below 150 microns and at least 90% of the cells have a diameter less than 100 microns.

For any particular layer mineral and any particular rigid foam density there is for a foam comprising wholly the layer mineral a maximum strength which can be achieved for the rigid foam and we have found that this maximum strength is achieved in rigid foams in which the diameter of the cells is controlled within the stated range. We especially prefer that at least 90% of the cells should be of diameter below 50 microns and that the maximum cell diameter be below 100 microns. It is to be understood that the actual compressive strength of the rigid foam will be dependent upon the particular layer mineral or grade of layer mineral or mixture of layer minerals employed, and the foam density, and will vary for different layer minerals and foam densities, but for any particular layer mineral and foam density the strongest foams are obtained by controlling the size of the cells to be within the stated size ranges.

Figure 2:
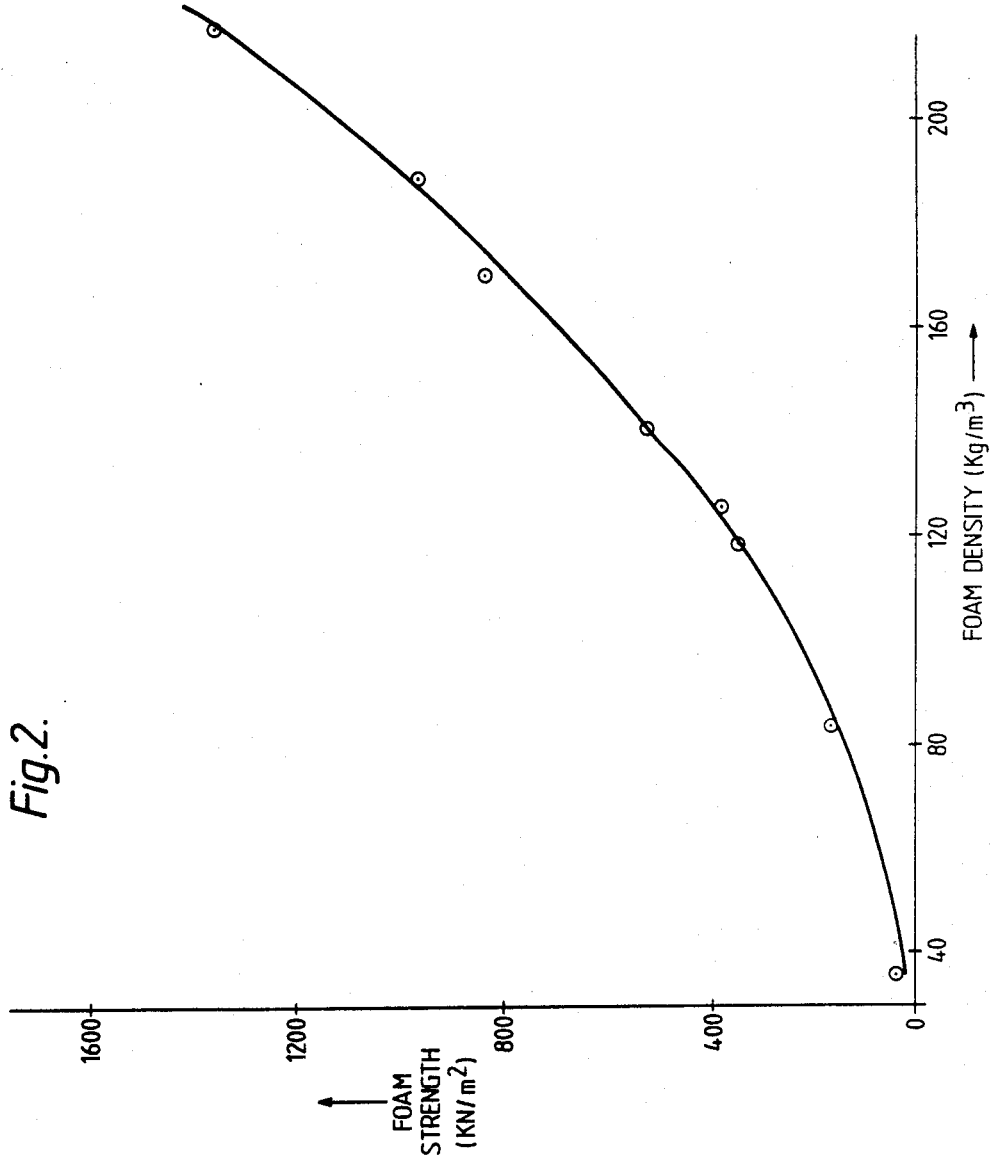

The optimum cell diameter for high foam strength is dependent upon the density of the rigid foam, being in general lower within the stated range for a more dense foam and higher within the stated range for a less dense foam. This is illustrated in FIGS. 1 and 2 of the accompanying drawings which are described in more detail in Example 1 hereinafter and show graphs of foam density against mean cell diameter and foam strength against foam density for rigid foams of maximum strength derived from a particular ball clay. The graphs illustrate that for strong foams of density 200–250 Kg/m$^3$, the optimum mean cell diameter is about 10 microns whilst for strong foams of density below 100 Kg/m$^3$ the optimum mean cell diameter is 40–50 microns.

The maximum cell size which can be tolerated is also closely related to foam density and again is in general greater the lower the density of the foam. Thus for less dense foams of density below 100 kg/m$^3$ a few cells of diameter up to 150 microns can be tolerated whilst for more dense foams, say in excess of 200 Kg/m$^3$ density, we prefer that the maximum cell size be below 100 microns.

According to the present invention also there is provided a process for the production of a strong rigid foam which comprises gasifying an aqueous suspension of a layer mineral to produce a stable wet foam or froth containing bubbles of gas of which the mean bubble diameter is less than 60 microns, at least 90% have a diameter less than 100 microns and the maximum diameter is below 150 microns, and removing at least part of the water from the wet foam or froth.

By the term 'stable wet foam or froth' as used throughout this specification we mean a wet foam or froth which on standing does not collapse or contract appreciably in volume within a period of 10 minutes, preferably within a period of 1 hour, and especially preferably within a period of 5 or 6 hours.

The rigid foams provided according to the invention have a true cellular structure and they comprise essentially-closed cells, the walls of which are constituted by the layer mineral. It is to be understood that by "essentially-closed cells" we mean cells which appear essentially closed under a microscope but of which the cell walls are permeable such that the foams are porous and permit diffusion of gases and liquids so that the cells are not true closed cells according to British Standards definition No. BS 4370 Part 2 - Method 10.

The majority of the cells in the foams are polyhedral in shape. However the invention is not limited to cells of any particular configuration. By the term "cell diameter" we mean the diameter of essentially polyhedral cells or the largest dimension of the cell in the case of cells which are non-symetrical. Also, for convenience, we describe the cell size as the "mean cell diameter" by which we mean the average diameter of those cells having a size within the stated size range of below 100 microns. Thus the term "mean cell diameter" does not indicate the distribution of cell sizes within the range up to 100 microns but is a convenient way of describing the rigid foams. Having regard to cell size distribution we prefer that the cells be as uniformly sized as possible and that the majority (say at least 60%) of the cells of diameter below 100 microns should be within about 20 microns of the mean cell diameter.

The importance of cell diameter and the relationships between cell diameter, foam density and foam strength is illustrated by and explained in the Examples hereinafter which show that foams containing cells of diameter greater than 150 microns tend to be weak and friable as also do foams containing more than about 10% of cells of diameter greater than about 100 microns and of which the mean cell diameter is greater than 60 microns.

Any layer mineral, by which term we mean a layer silicate or phyllosilicate mineral, may be used in the practice of the present invention, including for example vermiculite, kaolinite, kaolin-containing clays such as ball clays, china clays and fire clays, montmorillonite and sepiolite. Mixtures of layer minerals may be employed, for example mixtures of vermiculite with from 20–80% by weight of kaolinite or a kaolin-containing clay, as also may mixtures of one or more layer minerals with one or more materials other than layer minerals, for example mixtures of one or more layer minerals with one or more fillers and/or binders, which are preferably inorganic materials but may if desired be organic materials.

In the case of the layer mineral vermiculite we especially prefer to use chemically delaminated vermiculite by which we mean vermiculite which has been swollen by treatment with one or more aqueous solutions of salts such as sodium chloride, lithium salts or alkylammonium salts followed by soaking the treated vermiculite in water and applying shear to the resulting suspension of swollen vermiculite to delaminate the vermiculite into tiny and extremely thin platelets known as vermiculite lamellae. Any of the known processes for chemically delaminating vermiculite may be employed for providing the suspension of vermiculite for use in the present invention. The more usual heat-exfoliated form of vermiculite, ground to a fine powder (of particle size below say 50 microns) may also be employed although in this case it may be necessary to employ a binder material to produce a rigid foam from a suspension of the vermiculite.

The rigid foams provided according to the invention are of improved strength compared with rigid foams provided hitherto, and according to specific features of the invention there are provided rigid foams of density from 50 to 500 Kg/m$^3$ each of cellular structure comprising essentially-closed cells of mean cell diameter below 60 microns wherein substantially all of the cells are of diameter below 150 microns and at least 90% of the cells have a diameter less than 100 microns, preferably within the range 5 microns to 100 microns.

The rigid foams are produced in known manner by gasifying an aqueous suspension of one or more layer minerals optionally containing one or more fillers and/or binders to form a stable wet foam or froth, and subsequently removing at least part of the water from the wet foam or froth. However we have found that in order to provide a wet foam or froth having gas bubbles of the defined size and size distribution, it may be desirable to subject the layer mineral(s) to a beneficiation treatment prior to preparation of the rigid foams. Any of the beneficiation techniques known for upgrading layer minerals may be employed, including for example the removal from clays of non-layer minerals such as quartz and other non-platey material, e.g. clay aggregates, and the removal from chemically delaminated vermiculite or from vermiculite ore of material which is not swollen and delaminated by the delamination technique employed. Thus, for example, chemically delaminated vermiculite suspensions may be beneficiated by the process described in U.S. Pat. No. 3,076,546 which describes the removal of gangue material from vermiculite by treating the vermiculite with sodium chloride solutions and water to swell the vermiculite but not the gangue materials, followed by separation based on the differing densities of the swollen and non-swollen materials, and/or by the process described in United Kingdom Patent Specification No. 1,311,069 which describes the removal of non-swollen or inadequately swollen material from swollen vermiculite prior to delaminating the vermiculite by applying shear to the suspension of the swollen material in water.

It is especially important in the case of clays such as low-grade ball clays to at least to reduce the quartz content of the clay to an acceptably low level. Most naturally-occuring clays contain quartz in a amount ranging from as little as 5% by weight in high grade clays to as high as 60% by weight in low grade clays. We have found that the presence of appreciable amounts of quartz in the clay hinders the production of the strong rigid clay foams provided according to the present invention. We have found that in order to produce strong rigid foams from clays it is desirable to reduce the quartz content of the clay to below 20% by weight, preferably to below 10% by weight; we especially prefer the substantially complete elimination of quartz.

In the case of clays especially, but also in respect of all the layer minerals, we prefer to "clean-up" the raw material (if necessary) by removal of all aggregate materials, such as clay aggregates, sand, rock and other non-layer minerals (as well as quartz). Any of the known techniques for upgrading clays may be employed, for example sedimentation and centrifuging.

According to a further feature of the present invention there is provided a process as hereinbefore described for preparing a rigid foam as herein defined from a quartz-containing clay of quartz content greater than 20% by weight which comprises reducing the quartz content of the clay to below 20% by weight, preferably to below 10% by weight, prior to gasification of an aqueous suspension of the clay to foam a stable wet foam or froth.

In the production of rigid foams according to the invention a suspension of one or more layer minerals is gasified, for example by whisking or beating air into it, until a stable wet foam or froth is produced in which the diameter of the resulting gas bubbles and the size distribution of the gas bubbles are within the ranges hereinbefore defined. The gasification process may be monitored, for example, by removing a sample of the wet foam or froth and measuring the diameter of the bubbles in the sample of froth, or if desired by drying the froth and measuring the diameter of the cells in the resulting rigid foam. Once the optimum time of gasification has been determined for a particular suspension of a layer mineral in a particular apparatus, the gasification process is simply carried out for the pre-determined optimum time since results are reproduceable.

An alternative and preferred manner of monitoring the foam-forming operation is to monitor the density of the froth or wet foam produced. We have found that as work is done on the suspension to create the froth, the density of the frothed suspension firstly falls and then after a time the density usually rises again, i.e. a minimum density of the froth or wet foam is observed. We have found that the froth of minimum density usually produces the strongest foam when dried, and accordingly we prefer to cease the foaming operation upon achievement of the minimum wet foam density. There is a direct relationship between wet foam density and bubble size in the foam and we have found that the wet foam of minimum density contains bubbles of the diameter desired, i.e. in the range up to 150 microns with a mean diameter less than 60 microns.

The concentration of the layer mineral in the suspension for gasification is not critical and may vary within wide limits, for example from a few (say 3) % to 60% or even higher by weight depending upon the particular layer mineral employed. The sole requirement of the process is that the suspension be gasified to produce a wet foam or froth containing gas bubbles of the desired size and size distribution.

As stated, the solids content of the suspension is dependent upon the layer mineral employed, being in general higher for suspensions of clays than for suspensions of vermiculite or montmorillonite. As a guide, the solids content of ball clay suspensions usually will be in the range of from 15% to 60% by weight, preferably from about 30% to about 50% by weight, whilst the solids content of vermiculite or montmorillonite suspensions will usually be in the range of from about 5% to 30% by weight, preferably from about 10% to about 20% by weight.

For producing the stable wet foam or froth, any foaming agent may be employed which leads to the formation of a wet foam or froth which is stable and which contains gas bubbles of the desired diameter, although in practice the size of the gas bubbles in tne wet foam or froth is dependent upon the gasification conditions used, especially the time of gasification, as well as upon the particular foaming agent employed.

Examples of suitable foaming agents for use in the process are alkylammonium salts, fatty alkyl amines and their salts containing 8 or more carbon atoms in the alkyl group, alkylamine salts containing less than 8, say 6, carbon atoms and quaternary ammonium salts. However, as stated hereinbefore, any foaming agent may be employed which results in the production of a stable wet foam or froth. The suitability of a particular surface active agent for use in the process is readily determined by simple experiment as described for example in United Kingdom Patent Application No. 2067174A, that is a simple test to determine whether the agent at 2% by weight concentration in a 30% solids content suspension of the layer mineral(s) to be used is capable of forming a wet-foam or froth having the desired gas bubble size and distribution and if so whether the wet foam or froth is stable. We prefer to employ a foaming agent whicn can be used at low concentration, say below 1% by weight, to produce a wet foam or froth which is stable for at least several hours. Our especially preferred foaming agents in view of their relatively low cost are n-alkylammonium salts, for example n-butylammonium chloride, in the case of chemically delaminated vermiculite and fatty amine salts, for example octylammonium di-hydrogen phosphate, in the case of ball clays and other clays.

The rigid foams may if desired contain one or more additives such as fillers and agents designed to enhance one or more properties of the foam, for example the compressive strength and/or water stability of the foams. Thus for instance foams comprising at least an appreciable vermiculite content, say 20% by weight or more of vermiculite, may contain a compressive strength and water stability improver which is an oxide or hydroxide of calcium or magnesium, as is described in European Patent Publication No. 9310A1 and U.S. Pat. No. 4,269,628 referred to hereinbefore. Foams comprising vermiculite may be stabilised against degradation by water by incorporating a source of ammonium ions such as urea or hexamine (hexamethylenediamine) in the layer mineral suspension and heating the resulting foam at above 100° C., as described in United Kingdom Patent Application No. 8130686, or by incorporating a urea/formaldehyde resin or a melamine formaldehyde resin in the layer mineral suspension and curing the resulting foam, as described in United Kingdom Patent Application No. 8206238. Alternatively foams comprising vermiculite may be rendered waterstable by adding a silicone polymer precursor e.g. a siliconate to the suspension and subsequently treating the foam with an acid gas, or by post-treatment with aqueous solutions of electrolytes such as magnesium chloride as described for non-foamed, sheet vermiculite materials in United Kingdom Patent Specification No. 1016385.

Rigid foams made of clays or comprising a major proportion of clays may be sintered in known manner to confer improved strength and water-stability to them by heating the foam at elevated temperatures, for example above 1000° C. In the case of sintered rigid foams the size and distribution of the cells in the sintered material is within the ranges hereinbefore defined, although the cell size will in general be slightly less than in the foam before it is sintered.

The invention is described herein in relation to (a) the size (diameter) of the gas bubbles in the wet foam or froth obtained by gasifying an aqueous suspension, (b) the size (diameter) of the cells in the rigid foam obtained by removing water from the wet foam or froth, and (c) at least in the case of clay foams the size (diameter) of the cells in the sintered rigid foam. In all instances the size (diameter) is within the limits defined herein but it is to be understood that the actual bubble size (diameter) and distribution in the wet foam or froth may be different from those in the rigid foam produced from the wet foam or froth and furthermore the actual cell size (diameter) and distribution in the sintered foam may be different from those in the unsintered foam. However the changes in bubble/cell size (diameter) on changing from a wet foam or froth to a rigid foam to a sintered foam are proportionally constant and it is a matter of simple experiment to determine the desired bubble size in the wet foam or froth to yield the desired cell size (diameter) in the resulting rigid foams and sintered foams.

The rigid foams according to the invention, which may be in the form of extruded board or slab-stock, or prills (granules), may be used in any of the applications for which rigid inorganic foams have been proposed, for example in the applications described in the references mentioned hereinbefore. Included amongst such applications are insulation uses and the fire-protection of substrates such as structural steel, wood, organic foams such as polyurethane foams and polyisocyanurate foams, plastics and building panels and structures.

The invention is illustrated by the following Examples in which all parts and percentages are by weight unless otherwise stated.

EXAMPLE 1

Ten clay foams in the form of prills of varying density from 36 Kg/m³ to 268 Kg/m³ were prepared by the following general procedure; the clay employed was "Hymod" AT obtained from English china Clays Ltd.

GENERAL PROCEDURE

Dry clay powder was added, with stirring, to water in the mixing bowl of a Kenwood food mixer fitted with a whisk attachment and the mixture was stirred a low speed setting for a few seconds (10–30 seconds) to thoroughly disperse the clay and form a suspension. In most cases and especially in the production of suspensions of solids content greater than about 30% by weight a small amount of sodium tripolyphosphate deflocculating agent was dissolved in the water before the clay powder was added.

A solution of a foaming agent in water was then added to the stirred clay suspension and the mixture was stirred slowly for a few minutes to thoroughly disperse the foaming agent. The mixture was then whisked at maximum speed setting until a wet-foam or froth of minimum density was obtained, the time required being usually about 15 minutes. At intervals of about 5 minutes, mixing was stopped and foam was scrapped from the sides of the bowl and pushed down into the bottom of the bowl.

When a wet foam of the desired density and bubble size had been obtained the wet foam was pushed through a perforated metal plate to form short extrusions (0.5 to 1 cm in length) on the underside of the plate. The extrusions were dried at ambient temperature in a fume cupboard and the resulting dry prills of foam were dislodged from the metal plate and heated at 1000°–1050° C. in an oven for about 5 minutes to sinter them.

Using this general procedure ten samples of foam prills were produced of different density and strength depending upon the clay content of the suspension used to form the prills. For each set of prills, their foam density and compressive strength were determined, the latter by a trapped compression test using an Instron instrument. The trapped compression test comprises placing a weighed amount of prills in a mould (i.e. trapping the prills), compressing the assembly of prills with a piston to a predetermined volume and measuring the reaction pressure at this compression. For each set of prills also, the maximum cell size in the foam and the mean cell diameter were measured and recorded.

Using the results obtained, graphs were then plotted of (a) foam density against mean cell size in the foam and (b) foam strength against foam density. Graphs (a) and (b) are shown in FIGS. 1 and 2 respectively of the accompanying drawings.

Having regard to the drawings, FIG. 1 illustrates the relationship between foam density and cell size (denoted by mean cell diameter) in good, strong foams made from "Hymod" AT. The graph shows that the mean cell diameter of the foam was below 60 microns irrespective of the density of the foam. In fact in each foam the maximum cell diameter was below 150 microns and less than 10% of the cells were of diameter greater than 100 microns. FIG. 2 shows the relationship between foam density and foam strength, the foam strengths indicated being the highest we have achieved in several experiments for foam prills of the corresponding density. Thus considering FIGS. 1 and 2 together, they illustrate the relationship, for the best foam strengths we have achieved, between foam strengths and mean cell sizes in the foams; they demonstrate that for strong foams the mean cell size should be below 60 microns.

EXAMPLES 2–14

Using the clays and precise operating conditions given in Table 1 below, thirteen sets of foam prills were prepared by the general procedure described in Example 1.

| Example No | Clay | Solids in Suspension (%) | Foaming Time (Mins) | Foaming* Agent (%) | Sintering Temp (°C.) |
|---|---|---|---|---|---|
| 2 | 'HYMOD' KC (ball clay) | 47 | 20 | 2 | 1050 |
| 3 | 'HYMOD' KC (ball clay) | 45 | 20 | 2 | 1050 |
| 4 | 'HYMOD' KC (ball clay) | 16 | 15 | 2 | 1050 |
| 5 | 'HYMOD' KC (ball clay) | 18 | 15 | 2 | 1050 |
| 6 | 'HYMOD' KC (ball clay) | 25 | 20 | 2 | 1050 |
| 7 | 'HYMOD' AT (ball clay) | 55 | 8 | 2 | 1050 |
| 8 | 'HYMOD' VC (ball clay) | 40 | 20 | 2 | 1050 |
| 9 | 'HYMOD' VC (ball clay) | 30 | 20 | 2 | 1050 |
| 10 | LEE MOOR (China clay) | 35 | 20 | 2 | 1050 |
| 11 | CS 104** (Fire clay) | 35 | 20 | 5 | 1050 |
| 12 | MONTMORILLONITE | 15 | 20 | 2 | 300 |
| 13 | MONTMORILLONITE | 15 | 20 | 2 | 300 |
| 14 | MONTMORILLONITE | 15 | 20 | 2 | 300 |

**milled for 8 hours before use.
*'FORAFAC' - believed to be $C_6F_{13}(CH_2)_2SO_2NHCH_2\overset{\oplus}{}(CH_3)_2(CH_2)_2CO_2^{\ominus}$ For each set of prills values were determined of density, trapped compression strength, means cell diameter and maximum cell diameter. The results are shown in Table 2.

TABLE 2

| Example No | Density (Kg/m³) | T.C Strength (units*) | Mean Cell Diam (microns) | Max Cell Diam (microns) |
|---|---|---|---|---|
| 2 | 354 | 4697 | 8.2 | 23 |
| 3 | 290 | 2652 | 9.9 | 37 |
| 4 | 47 | — | 57 | 144 |
| 5 | 47 | — | 52 | 128 |
| 6 | 73 | 148 | 45.2 | 129 |
| 7 | 187 | 992 | 22.6 | 64 |
| 8 | 169 | 520 | 19.2 | 48 |
| 9 | 88 | 104 | 32 | 78 |
| 10 | 189 | 101 | 29.9 | 78 |
| 11 | 190 | 1330 | 10.1 | 30 |
| 12 | 100 | 167 | 28 | 92 |
| 13 | 151 | 349 | 23 | 98 |
| 14 | 155 | 236 | 26 | 94 |

*Since the trapped compression test does not yield absolute compressive strength values, strengths are recorded in 'units' and the values quoted are intended only for comparative purposes.

EXAMPLE 15

This Example illustrates the effect of mean cell size upon foam strength in foam prills made from 'HYMOD' AT ball clay.

A slurry of 35% by weight solids content was prepared by stirring 'HYMOD AT' clay into water until the clay was uniformly dispersed throughout the slurry. 'Forafac' foaming agent (1% by weight of the slurry) was stirred into the slurry and uniformly dispersed and the mixture was poured into the feed hopper of an Oakes continuous foam-making machine fitted with a rotor. Wet foam from the machine was pushed through the holes in a perforated plate and the resulting extrusions were dried, dislodged and sintered at 1050° C. for 5 minutes as described in Example 1. The Oakes machine was used at four different settings denoted in Table 3 below to produce four sets of foam prills which after sintering were analysed. The density, strength and mean cell diameter of the prills were determined and the results are shown in Table 3.

TABLE 3

| Expt | Rotor Speed (r.p.m) | Foam Density (dry) Kg/m³ | T.C Strength (units) | Mean/Max Cell Size (microns) | Comments |
|---|---|---|---|---|---|
| A | 400 | 81 | 53 | 95.5/263 | very weak |
| B | 800 | 79 | 80 | 71/229 | weak |
| C | 1200 | 85 | 120 | 62/190 | fairly weak |
| D | 1500 | 98 | 170 | 48/100 | strong |

Although the results are not directly comparable in view of the different foam densities recorded, and though mean cell diameter is not the only important parameter (i.e. actual cell sizes and cell distribution is also important), the results nevertheless indicate the trends that (i) reducing the mean cell diameter in the foam increases the strength of the foam and (ii) reducing the mean cell diameter to below 50 microns for foams of density about 80–100 Kg/m³ results in the production of stronger foams. Experiment D illustrates a strong foam according to the invention whilst Experiments A,B and C illustrate foams outside the scope of the present invention and are included for purposes of comparison only.

EXAMPLES 16 and 17

These Examples illustrate the advantage in foam strength of "cleaning up" low-grade clay before it is used to make foam prills.

Sets of foam prills of density approximately 70, 110, 145 and 170 Kg/m³ were produced by the general procedure described in Example 1 from untreated BKS/L ball clay containing about 54% in total of quartz and other clay aggregates. The strength of each set of prills was determined by the trapped compression test and the results were recorded.

A sample of the clay was subjected to hydrocyclone treatment to up-grade it. The treatment resulted in the removal of about 35% of the low-grade clay and produced an up-graded clay of quartz content 19%. Sets of prills of density approximately 70, 110, 145 and 170 Kg/m³ were produced from the upgraded clay and the strength of the prills was measured and recorded.

The results are shown in Table 5.

TABLE 5

| Foam Density (Kg/m³) | Prill Strength (units) | |
|---|---|---|
| | Untreated Clay | Treated Clay |
| 70 | 40 | 150 |
| 110 | 120 | 400 |
| 145 | 220 | 700 |
| 170 | 320 | 1000 |

The above procedures were repeated for foam prills of density about 110, 135, 170 and 200 Kg/m³ from untreated and treated CS 104 fireclay. The cleaning up treatment in the hydrocyclone resulted in a reduction in quartz content of the clay from about 9% to about 5% and the removal from the clay of about 32% of impurities. The results are shown in Table 6.

TABLE 6

| Foam Density Kg/m³ | Prill Strength (units) | |
|---|---|---|
| | Untreated Clay | Treated Clay |
| 110 | 160 | 400 |
| 135 | 300 | 600 |
| 170 | 500 | 1000 |
| 200 | 750 | 1400 |

EXAMPLES 18–20

Using the clays and operating conditions given in the Table below, three sets of clay foam prills were prepared by the general procedure described in Example 1 expect that in Example 20 sodium tripolyphosphate was excluded.

| Example No. | Clay | Solids in Suspension (%) | Foaming Time (mins) | *Foaming Agent (%) | Sinter Temp (°C.) |
|---|---|---|---|---|---|
| 18 | Hymod KC | 50 | 20 | 1 | 1050 |
| 19 | Hymod KC | 50 | 4 | 1 | 1050 |
| 20 | Hymod KC | 30 | 20 | 1 | 1050 |

*The foaming agent was octylamine phosphate in solution and its weight is the weight of dry octylamine phosphate.

For each set of prills values were determined of density, trapped compression strength (T.C. Strength) and mean cell diameter:

| Example No. | Density (Kg/m³) | T.C Strength (units) | Mean Cell Diameter (microns) |
|---|---|---|---|
| 18 | 198 | 1384 | 18 |
| 19 | 200 | 1030 | 22.5 |
| 20 | 174 | 1184 | 22 |

We claim:

1. A rigid foam of cellular structure comprising one or more layer minerals wherein the mean cell diameter is less than 60 microns, the cells are of diameter below 150 microns and at least 90% of the cells have a diameter less than 100 microns.

2. A rigid foam as claimed in claim 1 wherein at least 90% of the cells are of diameter below 50 microns.

3. A rigid foam as claimed in claim 2 wherein the cells have a diameter less than 100 microns.

4. A rigid foam as claimed in claim 1, 2 or 3 wherein the majority of the cells of diameter below 100 microns have a diameter within about 20 microns of the mean cell diameter.

5. A rigid foam as claimed in claim 1 of density from 50 to 500 kg/m³.

6. A rigid foam as claimed in claim 5 wherein at least 90% of the cells have a diameter within the range 5 microns to 100 microns.

7. A rigid foam as claimed in claim 1 wherein the layer mineral is a kaolin-containing clay.

8. A rigid foam as claimed in claim 1 in the form of prills.

9. A process for the production of a strong rigid foam which comprises gasifying an aqueous suspension of a layer mineral to produce a stable wet foam or froth containing bubbles of gas of which the mean bubble diameter is less than 60 microns, at least 90% have a diameter less than 100 microns and the maximum diameter is below 150 microns, and removing at least part of the water from the wet foam or froth.

10. A process as claimed in claim 9 wherein the suspension is gasified to produce a wet foam or froth containing bubbles of gas of which at least 90% have a diameter below 50 microns.

11. A process as claimed in claim 10 wherein the maximum diameter of the bubbles of gas is below 100 microns.

12. A process as claimed in claim 9, 10 or 11 wherein gasification of the suspension is continued until the density of the wet foam or froth reaches a minimum value.

13. A process as claimed in claim 9 wherein the suspension is gasified in the presence of a foaming agent which is an alkylamine salt.

14. A process as claimed in claim 9 wherein the wet foam or froth is subjected to a prilling operation to produce a dry rigid foam in the form of prills.

15. A process as claimed in claim 9 wherein the layer mineral is a clay and after the removal of water from the wet foam or froth the foam is sintered by heating.

16. A process as claimed in claim 15 wherein the foam is heated at a temperature above 1000° C. to sinter it.

17. A process as claimed in claim 9 wherein prior to gasification of the suspension the layer mineral is subjected to a beneficiation treatment.

18. A process as claimed in claim 17 wherein the layer mineral is a clay and the beneficiation treatment comprises the removal of quartz and/or aggregates from the clay.

19. A process as claimed in claim 18 wherein the benefication treatment comprises reduction of the quartz content of the clay to below 20% by weight of the clay.

20. A process as claimed in claim 19 wherein the quartz content of the clay is reduced to below 10% by weight of the clay.

* * * * *